(12) United States Patent
Seo et al.

(10) Patent No.: US 7,517,145 B2
(45) Date of Patent: Apr. 14, 2009

(54) WATER SENSOR FOR AIR CONDITIONER OF A CAR

(75) Inventors: Jeong-Hun Seo, Daejeon-si (KR); Young-Kuen Kim, Daejeon-si (KR)

(73) Assignee: Halla Climate Control Corp., Daejeon (KR)

( * ) Notice: Subject to any disclaimer, the term of this patent is extended or adjusted under 35 U.S.C. 154(b) by 233 days.

(21) Appl. No.: 11/634,825

(22) Filed: Dec. 6, 2006

(65) Prior Publication Data

US 2007/0140312 A1 Jun. 21, 2007

(30) Foreign Application Priority Data

Dec. 6, 2005 (KR) ...................... 10-2005-0117950

(51) Int. Cl.
*G01K 1/00* (2006.01)
*G01K 13/00* (2006.01)
*G01K 7/00* (2006.01)

(52) U.S. Cl. ........................ 374/147; 374/185; 374/165; 374/208; 374/145

(58) Field of Classification Search ................. 374/145, 374/147, 183, 185, 208, 165
See application file for complete search history.

(56) References Cited

U.S. PATENT DOCUMENTS

| 4,971,452 A * | 11/1990 | Finney .................. 374/208 |
| 5,707,151 A * | 1/1998 | Parker et al. ................. 374/120 |
| 6,328,468 B1 * | 12/2001 | Nagano et al. .............. 374/141 |
| 6,334,707 B1 * | 1/2002 | Ku .............................. 374/208 |
| 7,341,097 B2 * | 3/2008 | Darby ........................ 165/11.1 |
| 2003/0041610 A1 * | 3/2003 | Shirota et al. ................. 62/244 |
| 2004/0069480 A1 * | 4/2004 | Yamamoto et al. .......... 165/202 |
| 2004/0134207 A1 * | 7/2004 | Morita et al. ................. 62/158 |
| 2004/0190590 A1 * | 9/2004 | Wienand et al. ............ 374/147 |
| 2005/0178523 A1 * | 8/2005 | Itoh et al. ...................... 165/42 |
| 2008/0008227 A1 * | 1/2008 | Jang et al. ................... 374/208 |

FOREIGN PATENT DOCUMENTS

| KR | 10-2006-0104124 | 10/2006 |
| KR | 10-2006-0104125 | 10/2006 |

\* cited by examiner

*Primary Examiner*—Gail Verbitsky
*Assistant Examiner*—Mirellys Jagan
(74) *Attorney, Agent, or Firm*—The Webb Law Firm

(57) ABSTRACT

Disclosed therein is a water temperature sensor for an air conditioner of automotive vehicles, which is mounted inside an air-conditioning case for measuring the temperature of cooling water, thereby preventing an air leakage from a mounted position of the water temperature sensor, enhancing work efficiency and productivity by reducing the number of components and the number of work processes, and greatly improving a response to heat around the sensor and a degree of precision in temperature measurement.

10 Claims, 9 Drawing Sheets

- Prior Art -

- Prior Art -

— Prior Art —

(a)

(b)

WATER SENSOR FOR AIR CONDITIONER OF A CAR

BACKGROUND OF THE INVENTION

1. Field of the Invention

The present invention relates to a water temperature sensor for an air conditioner of automotive vehicles, and more particularly, to a water temperature sensor for an air conditioner of automotive vehicles, which is mounted inside an air-conditioning case for measuring the temperature of cooling water of a heater core, thereby preventing an air leakage from a mounted position of the water temperature sensor, enhancing work efficiency and productivity by reducing the number of components and the number of work processes, and providing efficient air-conditioning effect by greatly improving a response to heat around the sensor and a degree of precision in temperature measurement.

2. Background Art

In general, an air conditioner is installed inside an automotive vehicle for providing a passenger with an agreeable environment in various weather conditions or traveling conditions. Such an air conditioner is a device which exchanges heat by selectively passing air, which is introduced into an air-conditioning case by a blower unit having a blast fan, through an evaporator in which refrigerant flows or a heater core in which cooling water of a vehicle engine flows, and then distributes the air of a cooled or heated state through vents fluidically communicating with air discharge holes in various directions inside the vehicle to thereby cool or heat the inside of the vehicle.

In addition, the air conditioner includes an automatic temperature controlling device (FATC) as a means for controlling the indoor temperature of the vehicle to the optimum state according to temperature changes inside and outside the vehicle. The automatic temperature controlling device controls various module motors (a mode door motor, a temp door motor, and an indoor and outdoor air door motor) through a logical operation performed by a microcomputer after receiving input signals from various sensors for sensing the indoor air temperature, the outdoor air temperature and water temperature of the evaporator and the heater core, and from control switches, so that the automatic temperature controlling device keeps a driver's set temperature state of the indoor temperature.

Here, the sensor for sensing water temperature of the heater core (hereinafter, referred to as 'water temperature sensor') is mounted on the outer surface of the heater core to sense the temperature of the outer surface of the heater core so as to detect the cooling water temperature inside the heater core.

FIG. 1 illustrates a structure of the prior art water temperature sensor.

As shown in FIG. 1, the water temperature sensor 100 includes: a housing 101 adapted to be in contact with the outer surface of the heater core; a thermistor 102 embedded inside the housing 101 for changing a resistance value depending on the temperature transmitted from the housing 101; a lead wire 103 connected to the thermistor 102 and surrounded partially by an insulating tube 104; a connector 106 electrically connected to a controller (not shown) of the automatic temperature controlling device via a terminal section 105 coupled to an end portion of the lead wire 103; and a clip 107 formed integrally on the connector side and fixed at a predetermined portion of the outside of an air-conditioning case 200 (see FIG. 2).

The housing 101 is opened at the upper part and filled with epoxy resin 108 for molding, and a portion of the housing 101 where the thermistor 101 is connected with the lead wire 103 is fixed by epoxy resin 109 for coating.

That is, the water temperature sensor is manufactured through the steps of inserting the thermistor 102, which is connected with an end of the lead wire 103 fixed by epoxy resin 109 for coating, into the housing 101 filled with the epoxy resin 108 for molding and applying heat to the housing 101 to harden the epoxy resin 108 for molding.

As shown in FIGS. 2 and 3, such a water temperature sensor 100 is arranged to be in contact with the outer surface of a tank part 201a of a heater core 201 through a box-like sensor insertion space 200a, which is cut at the lower side of an air-conditioning case 200 having the heater core 201 therein and protrudingly formed on a portion opposed to the outer surface of the tank part 201a of the heater core 201, and then, fixed by a clamp 210 inserted between the air-conditioning case 200 and the heater core tank part 201a.

As shown in FIG. 3, the clamp 210 includes a substantially straight type main body 211, a fixed section 212 bent at a longitudinal end of the main body 211, and a number of pressing sections 213 inclinedly protruding from the main body 211 toward the tank part 201a of the heater core 201. The clamp 210 is located between the housing 101 of the water temperature sensor 100 located on the outer surface of the tank part 201a of the heater core 201 embedded in the air-conditioning case 200 and the lower side of the air-conditioning case 200, has the upper portion of the main body 211, which is in close contact with the lower side of the air-conditioning case 200, presses the housing 101 of the water temperature sensor 100 toward the outer surface of the tank part 201a by the pressing sections 213, and is constricted on the lower side of the air-conditioning case 200 having the sensor insertion space 200a, whereby the housing 101 of the water temperature sensor 100 is fixed.

As described above, the water temperature sensor 100 has an end portion fixed by the clamp 210 and the other end portion fixed on the outer surface of the air-conditioning case 200 in an exposed state from the sensor insertion space 200a by the clip 107 as shown in FIG. 2.

However, the structure of the prior art water temperature sensor 100 has several problems in that it is complicated in mounting work and deteriorates operational efficiency and productivity due to an increase of work processes since the water temperature sensor 100 is fixed by the clamp 210 after the thermistor 102 is inserted into the sensor insertion space 200a formed in the lower part of the air-conditioning case 200.

Moreover, the prior art has another problem in that air-conditioning performance is deteriorated due to an air leakage to the outside through the sensor insertion space 200a since the sensor insertion space 200a for mounting the water temperature sensor 100 therein is separately cut and formed in the lower part of the air-conditioning case 200.

To prevent the air leakage, a sealing member (not shown) may be mounted on the sensor insertion space 200a, but in this instance, it may cause a rise of manufacturing costs.

Meanwhile, the prior art has a further problem in that the number of components is increased and manufacturing costs rises since epoxy resins 108 and 109 for fixing the thermistor 102 and the insulating tube 103 for protecting the lead wire 103 exposed to the outside of the air-conditioning case 200 are needed and the lead wire 103 must be formed long.

Furthermore, the prior art has another problem in that a thermal time constant required for transferring heat around the sensor to the thermistor 102 becomes large and a response is deteriorated since the housing 100 of the water temperature sensor 100 is made of only polypropylene, and so, an air-conditioning efficiency is lowered due to imprecise measurement of water temperature.

SUMMARY OF THE INVENTION

Accordingly, the present invention has been made to solve the above problems occurring in the prior art, and it is an object of the present invention to provide a water temperature sensor for an air conditioner of an automotive vehicle, which is mounted inside an air-conditioning case for measuring the temperature of cooling water, thereby preventing an air leakage from a mounted position of the water temperature sensor, enhancing work efficiency and productivity by reducing the number of components and the number of work processes, and providing efficient air-conditioning effect by greatly improving a response to heat around the sensor and a degree of precision in temperature measurement.

To accomplish the above objects, according to the present invention, there is provided a water temperature sensor for an air conditioner of automotive vehicles comprising:

a thermistor of which resistance varies depending on the temperature of cooling water of a heater core mounted inside an air-conditioning case;

a housing body having a receiving portion, a lower housing and an upper housing, the receiving portion formed in the lower housing and having a predetermined space for receiving and surrounding the thermistor, the predetermined space being filled with thermosetting resin for fixing the thermistor, the lower housing having a heat-transferring portion formed on the lower end side thereof and being fixed to a heat-shielding cover surrounding heater core pipes, which are exposed to the outside of the air-conditioning case to allow the heat-transferring portion to come into contact with the heater core pipes, and the upper housing being curved from the upper end side of the lower housing in one direction and having a connector formed on an end portion thereof; and terminal sections coupled to end portions of lead wires separately connected to the thermistor inside the housing body and connected to the connector side.

Moreover, the receiving portion is formed in a frusto-conical shape, which is narrowed downwardly, to easily receive the thermistor therein and upwardly protrudes from the surface of the heat-transferring portion in an integrated manner.

Furthermore, the receiving portion and the heat-transferring portion are made of metal material.

The lead wires are connected from the thermistor to the terminal sections in the shape of a 'Y' in cross section.

In addition, the lower housing is in a substantially cylindrical shape, and the heat-transferring portion formed on the lower end side of the lower housing is formed in the shape of an arc to be in close contact with the outer peripheral surfaces of the heater core pipes.

The water temperature sensor is formed integrally by a double injection-molding.

The lower housing extends in a substantially perpendicular direction to the heater core pipes and the upper housing extends in parallel plane with the heater core pipes.

Additionally, the lower housing is inserted into an insertion hole formed on the heat-shielding cover, and further includes a second coupling means fixedly coupled to a first coupling means formed on the inner peripheral surface of the insertion hole.

In addition, the first coupling means is the first and second retaining portions coupled with the second coupling means, first and second guide grooves; or the first and second guide grooves coupled with the second coupling means, first and second retaining portions.

The first guide groove includes a first receiving groove formed on the front end portion thereof and a first retaining groove formed on the rear end portion thereof, and in this instance, the second guide groove includes a second retaining groove formed on the front end portion thereof and a second receiving groove formed on the rear end portion thereof.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
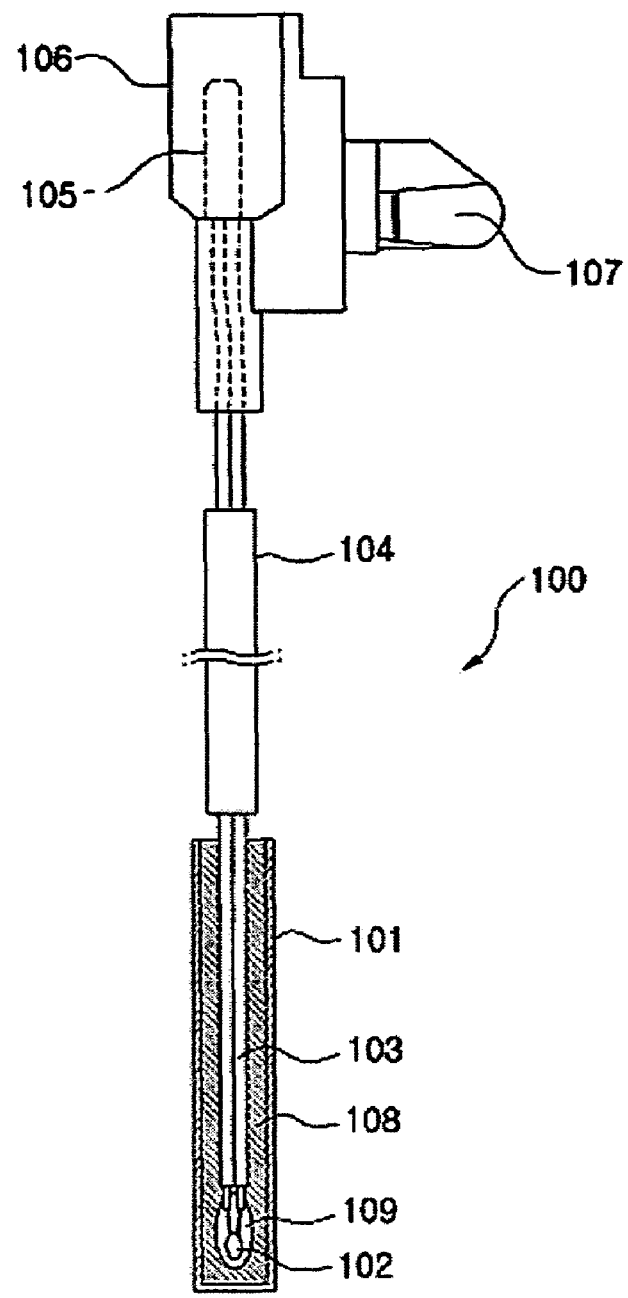
FIG. 1 is a configurational view of a prior art water temperature sensor.
Figure 2:
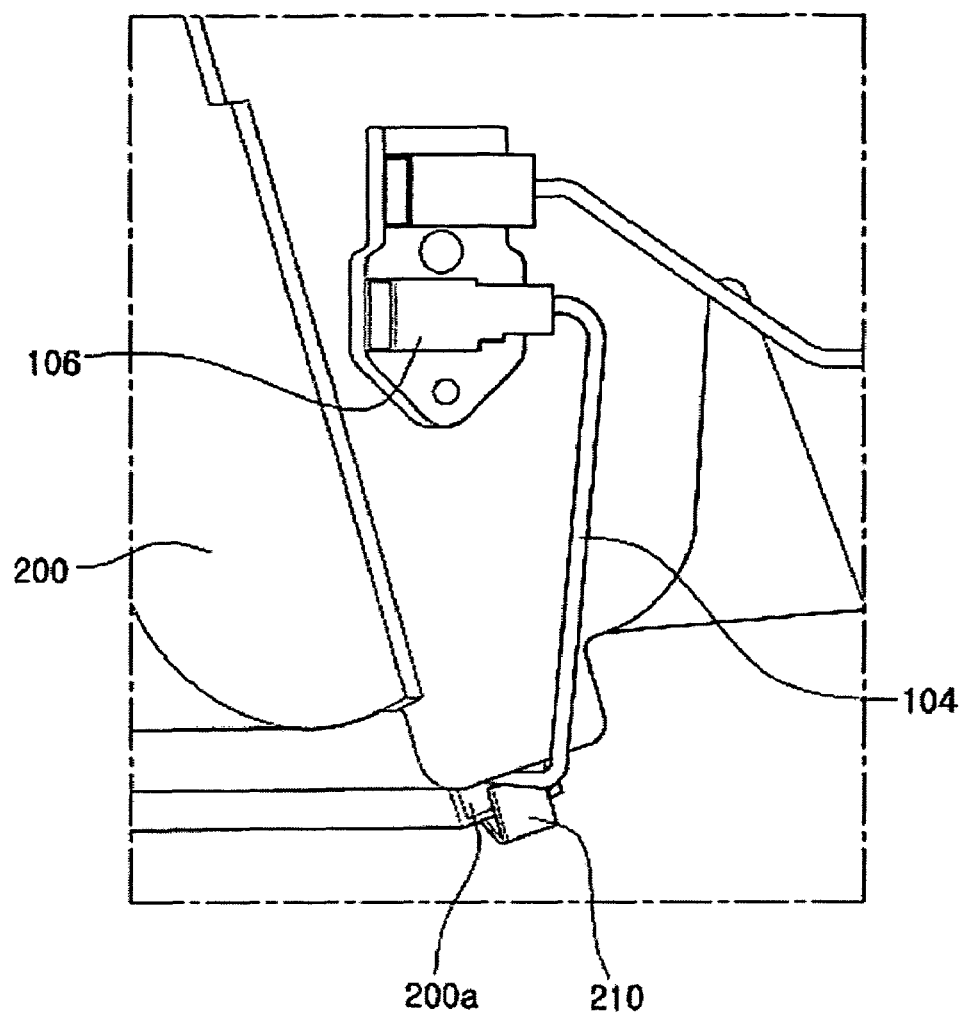
FIG. 2 is a partial side perspective view of an air-conditioning case for showing a state where the prior art water temperature sensor is mounted in the air-conditioning case of an air conditioner of automotive vehicles.
Figure 3:
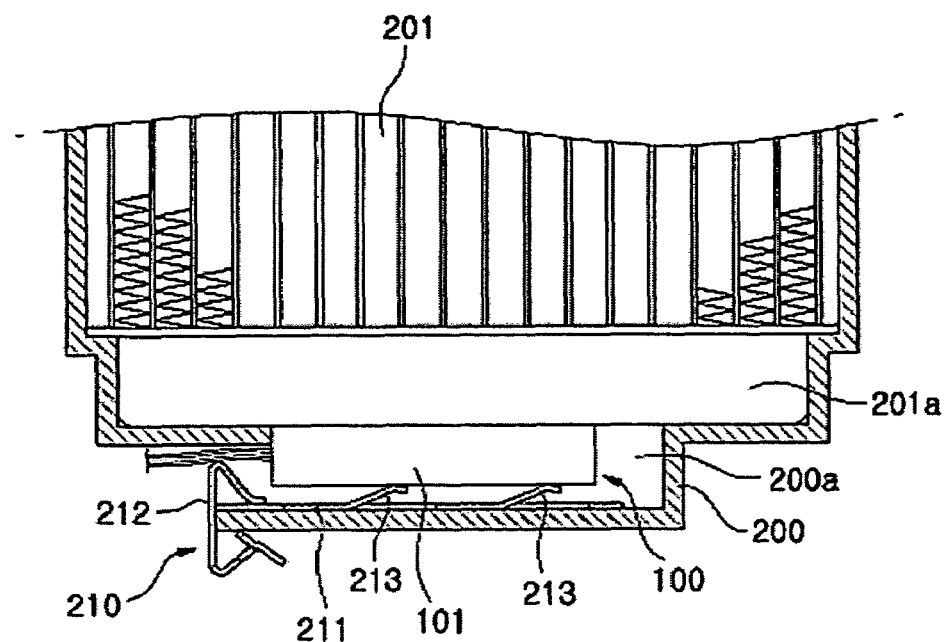
FIG. 3 is a partial sectional view showing a state where the prior art water temperature sensor is fixed by a clamp.
Figure 4:
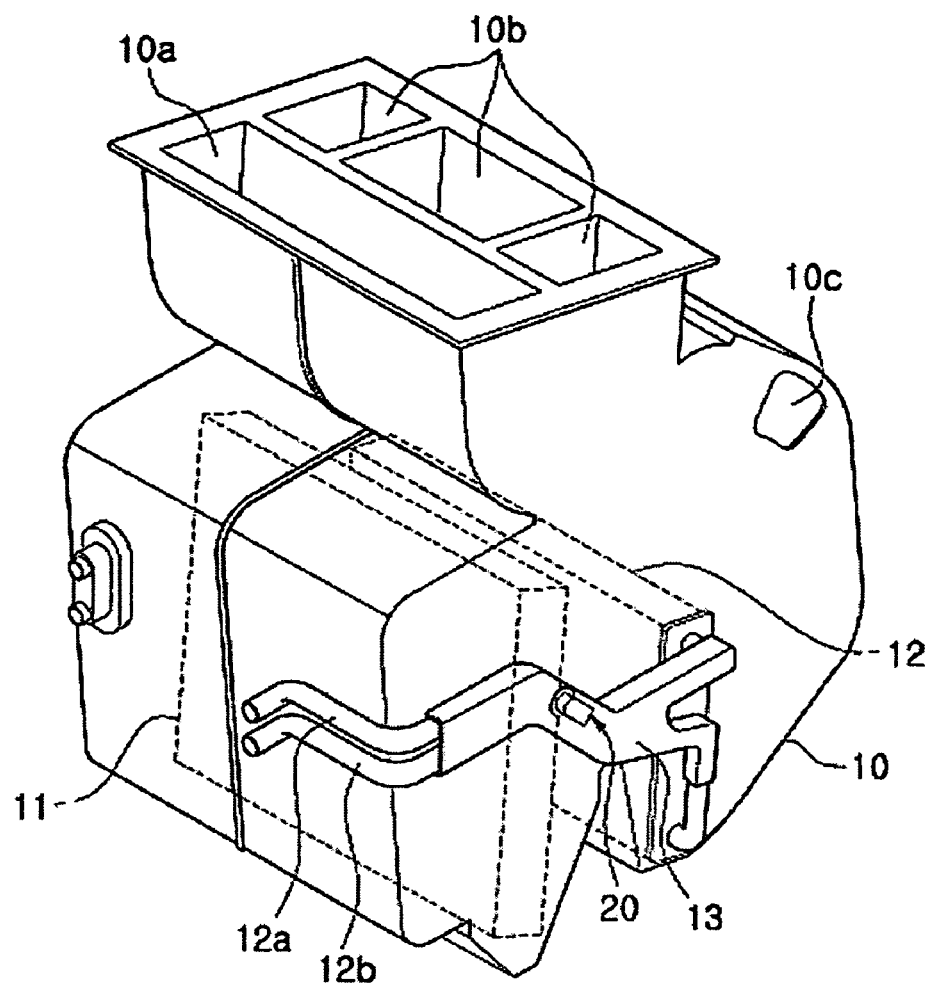
FIG. 4 is a schematic perspective view of an air conditioner to which a water temperature sensor according to the present invention is mounted.
Figure 5:
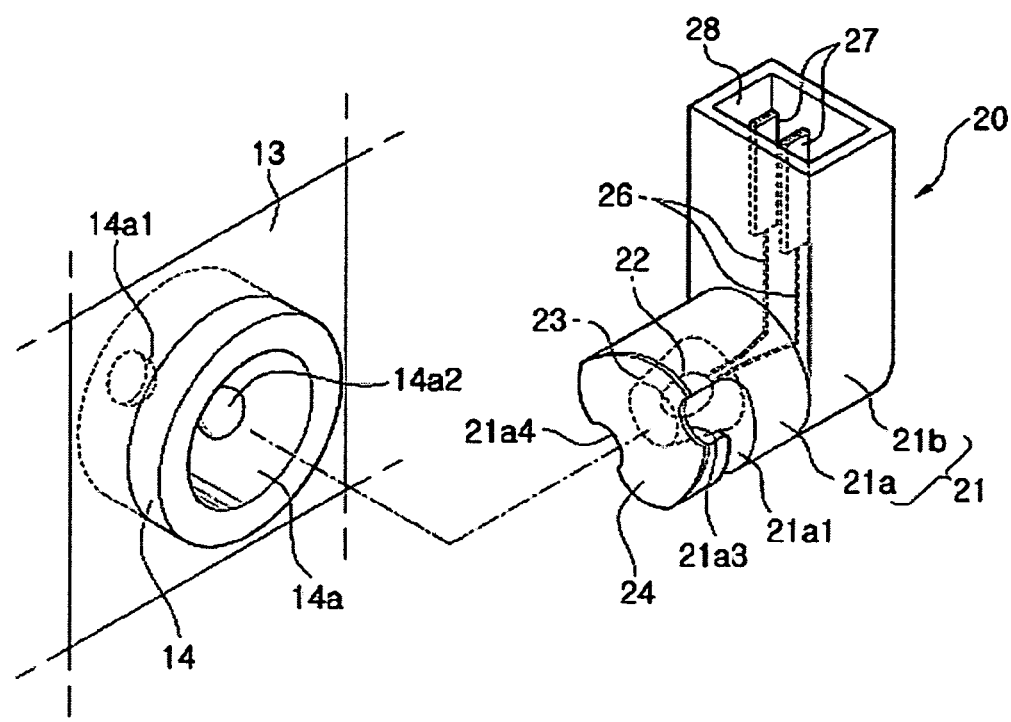
FIG. 5 is a schematic perspective view showing structures of the water temperature sensor and an insertion hole formed on a heat-shielding cover of a heater core pipe according to the present invention.
Figure 6:
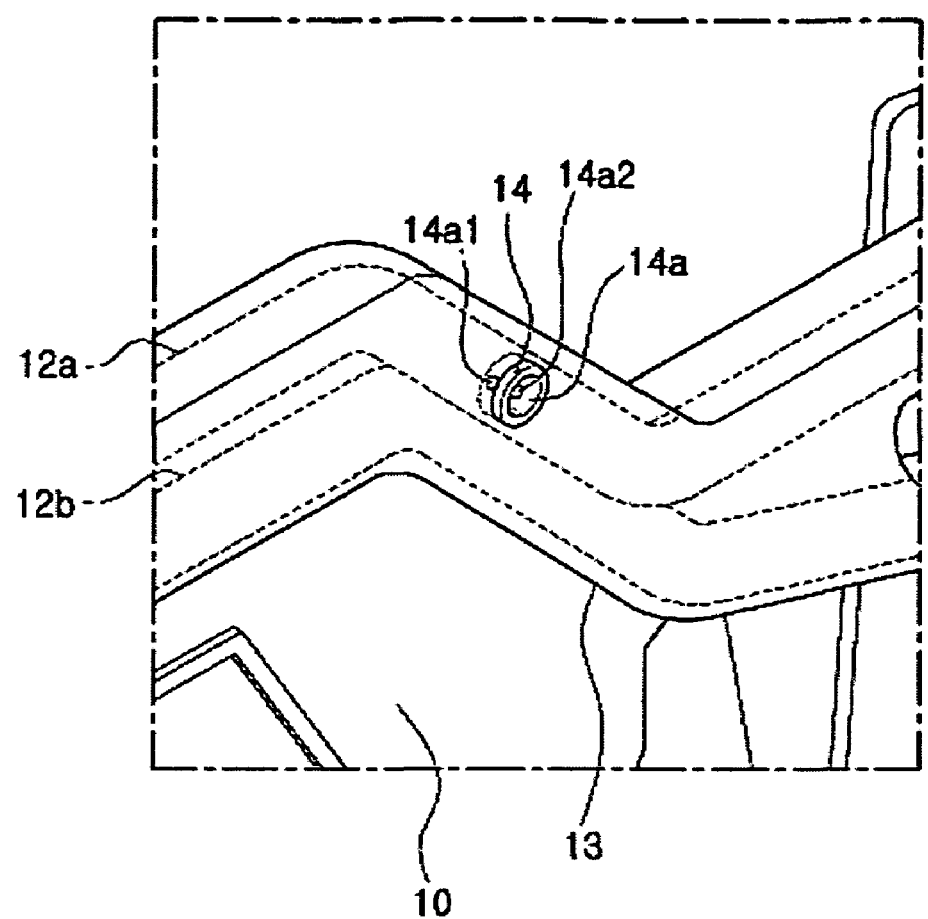
FIG. 6 is a partially perspective view for showing a formation position of the insertion hole formed on the heat-shielding cover of the heater core pipe in FIG. 4.
Figure 7:
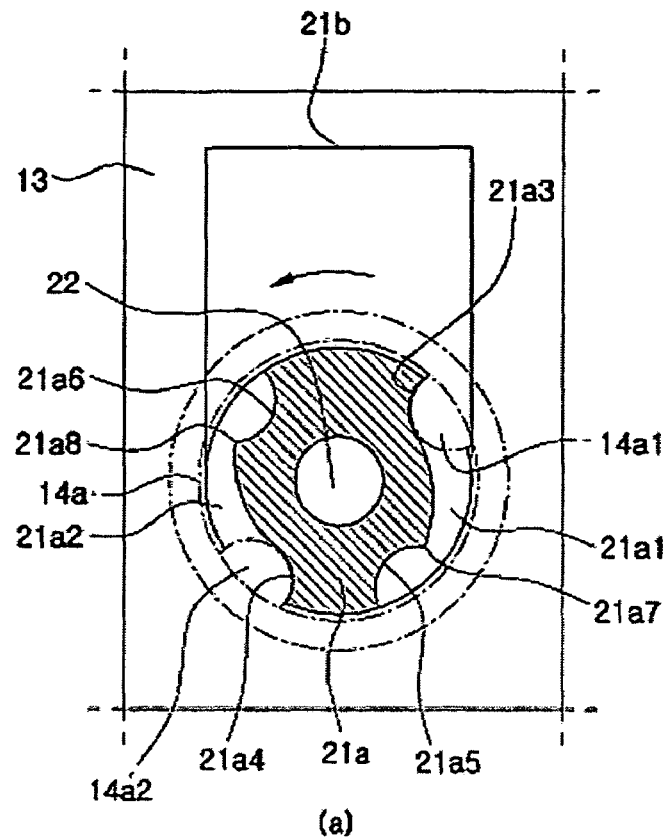
FIG. 7(a) is a schematic sectional view showing a state before the water temperature sensor of the present invention is assembled to the insertion hole, seen from the inside of the heat-shielding cover.
FIG. 7(b) is a schematic sectional view showing a state after the water temperature sensor of the present invention is assembled to the insertion hole, seen from the inside of the heat-shielding cover.
Figure 7:
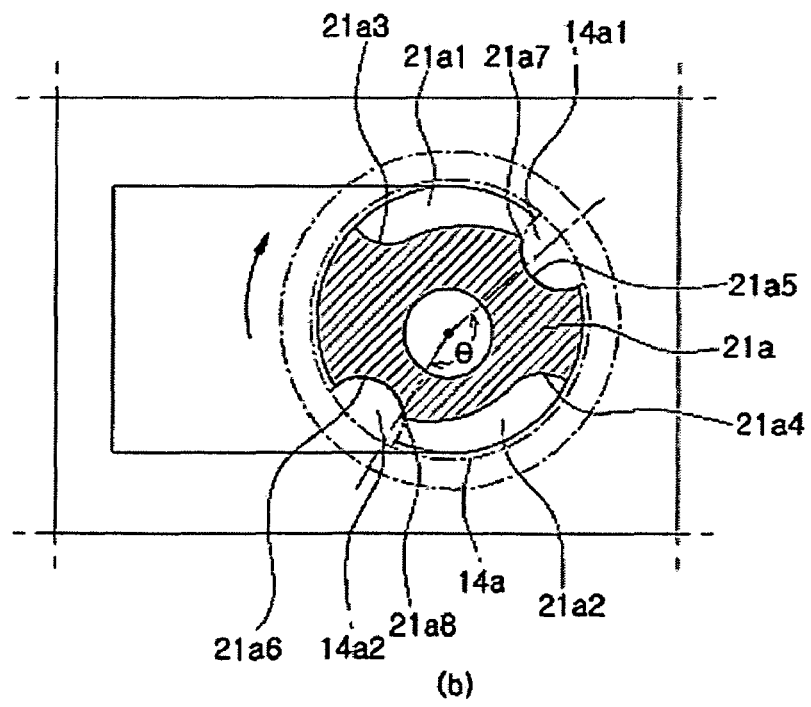
Figure 8:
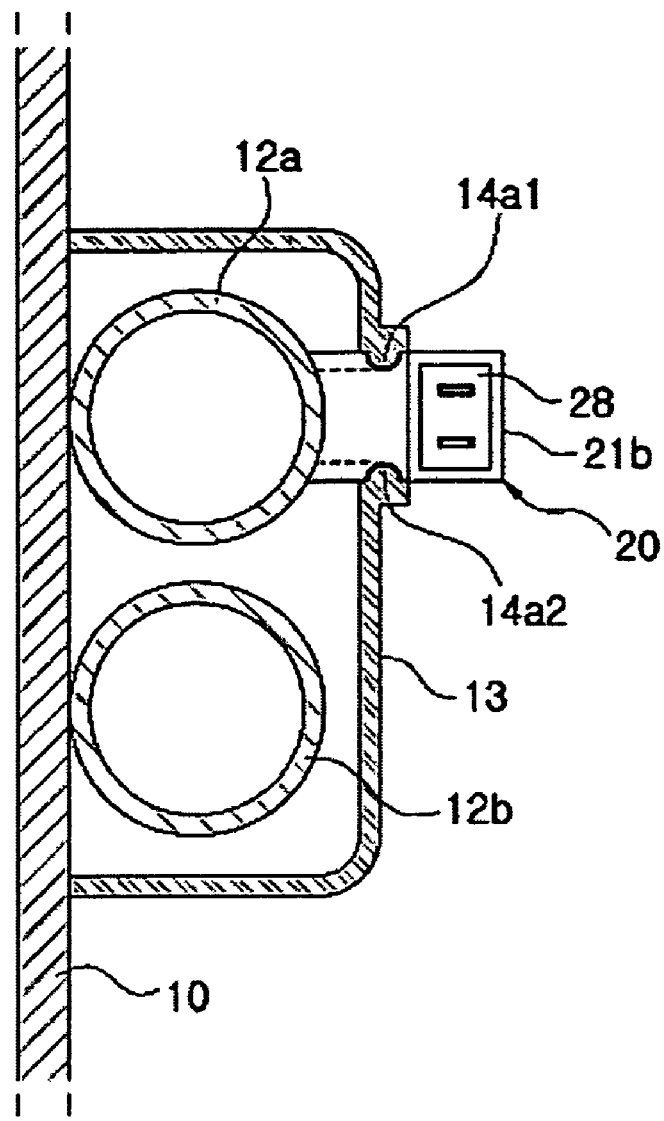
FIG. 8 is a sectional view showing a mounted state of the water temperature sensor according to the present invention.
Figure 9:
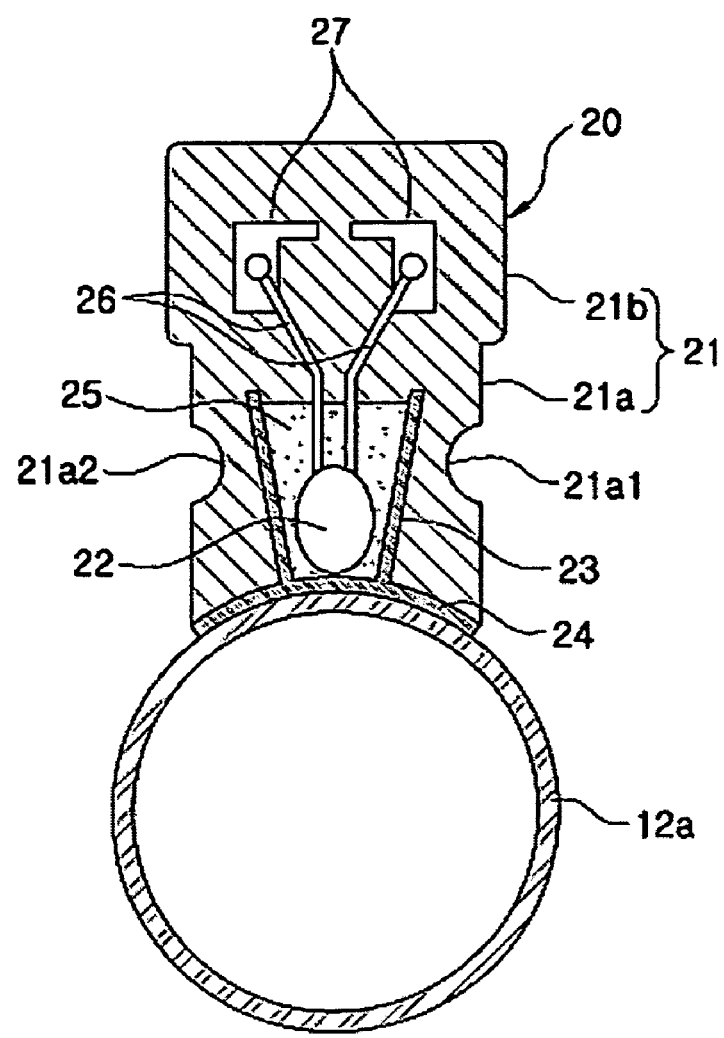
FIG. 9 is a sectional view showing a mounted state of the water temperature sensor from which an air-conditioning case and the heat-shielding cover are omitted.

FIG. 4 is a schematic perspective view of an air conditioner to which a water temperature sensor according to the present invention is mounted, FIG. 5 is a schematic perspective view showing structures of the water temperature sensor and an insertion hole formed on a heat-shielding cover of a heater core pipe according to the present invention, FIG. 6 is a partially perspective view for showing a formation position of the insertion hole formed on the heat-shielding cover of the heater core pipe in FIG. 4, FIG. 7(a) is a schematic sectional view showing a state before the water temperature sensor of the present invention is assembled to the insertion hole, seen from the inside of the heat-shielding cover, FIG. 7(b) is a schematic sectional view showing a state after the water temperature sensor of the present invention is assembled to the insertion hole, seen from the inside of the heat-shielding cover, FIG. 8 is a sectional view showing a mounted state of the water temperature sensor according to the present invention, and FIG. 9 is a sectional view showing a mounted state of the water temperature sensor from which an air-conditioning case and the heat-shielding cover are omitted.

The air conditioner for automotive vehicles to which the water temperature sensor according to the present invention is applied is a semi-center mounting type air conditioner having an evaporator and a heater core which are formed integrally with each other inside an air-conditioning case, but the present invention is not restricted to such a type.

FIG. 4 illustrates a state where the air-conditioning case of the air conditioner is seen from the rear side. The air-conditioning case 100 according to the present invention includes an air inflow port (not shown) connected with a blast duct of a blower unit at an entrance end thereof for introducing the indoor air and the outdoor air, a number of air vents 10a, 10b and 10c respectively formed at an exit end thereof for discharging air to the inside of the vehicle, and an evaporator 11 and a heater core 12 for selectively heat-exchanging air introduced through the air inflow port. Additionally, not shown in the drawing, but the air-conditioning case 10 further includes a temp door formed between the evaporator 11 and the heater core 12 for adjusting temperature of the air which is introduced from the air inflow port and selectively heat-exchanged, and a number of blast mode doors for selectively changing a flow direction of the heat-exchanged air discharged through the air vents 10a, 10b and 10c according to an opening angle of the temp door.

In the air conditioner having the above configuration, the present invention is characterized in that the water temperature sensor for sensing temperature of cooling water contained inside the heater core is mounted at the inside position of the air-conditioning case where air is not leaked to the outside and rapidly assembled at a mounting position in a more simple manner by reducing the number of components and work processes, thereby providing efficient air-conditioning effect by greatly enhancing a response to heat around the sensor and a precision in temperature measurement.

In general, the heater core 12 includes two heater core pipes 12a and 12b respectively connected to upper and lower tank parts (not shown) of the heater core 12 for introducing and discharging cooling water which is working fluid. The heater core pipes 12a and 12b are drawn to the outside of the air-conditioning case 10 in fixed form and length to be connected with an engine seated on a predetermined position of an engine room of the vehicle.

However, the heater core pipes 12a and 12b may burn a driver when the driver's foot is in contact with the heater core pipes 12a and 12b since they are exposed to a position where the driver's foot can be in contact with the heater core pipes 12a and 12b. So, it is preferable that a heat-shielding cover 13 of a predetermined thickness for surrounding the heater core pipes 12a and 12b is additionally mounted to intercept heat from the outside.

The water temperature sensor 20 for sensing temperature of cooling water by contact with the outer peripheries of the heater core pipes 12a and 12b is mounted through an insertion hole 14a formed at a predetermined portion of the heat-shielding cover 13.

First, before a configuration of the water temperature sensor 20 is described, a structure of the insertion hole 14a to which the water temperature sensor 20 is assembled and fixed will be described.

As shown in FIGS. 5 and 6, the insertion hole 14a is formed to be opened to the inside of the heat-shielding cover 13 through the center of a cylindrical wall 14 protrudingly formed on a predetermined portion of the heat-shielding cover 13 in such a way that one of the heater core pipes 12a and 12b is exposed to the outside. In addition, a first directional coupling means is formed on the inner periphery of the insertion hole 14a to be coupled with a second coupling means, which will be described later.

As shown in the drawings, the first coupling means includes first and second retaining portions 14a1 and 14a2 hemispherically protruding at a position where they are cross to each other. A formation angle (θ) of the first and second retaining portions 14a1 and 14a2 is within a range of about 90° to 180°, and preferably, 150°. In FIG. 6, the insertion hole 14a is formed on the heater core pipe 12a in which cooling water is introduced into the upper tank part of the heater core.

As shown in FIG. 5, the water temperature sensor 20 mounted through the insertion hole 14a includes a housing body 21, a thermistor 22, lead wires 26 and terminal sections 27.

The housing body 21 is formed in the shape of a substantially 'L', and includes a lower housing 21a and an upper housing 21a formed integrally with the upper end of the lower housing 21a, bent at right angles to the lower housing 21a and horizontally protruding to a predetermined length. A connector 28 is formed on an end portion of the upper housing 21b and electrically connected with an external controlling device (not shown) and connected with the terminal sections 27.

Here, the upper housing 21b is exposed to the outside from the insertion hole 13a, and serves to electrically connect the connector 28 formed on the end portion thereof and the external controlling device with each other.

Furthermore, as shown in FIG. 9, the lower housing 21a has a substantially cylindrical structure and a length and the outer diameter nearly corresponding to a length and the inner diameter of the insertion hole 14a so as to be inserted and fixed to the insertion hole 14a. The lower housing 21a has a predetermined space for receiving and surrounding the thermistor 22. The lower housing 21a includes a receiving portion 23 filled with thermosetting resin 25 for fixing the thermistor 22 inside the predetermined space, and a heat-transferring portion 24 formed on the lower end side thereof and contacting with one (in this embodiment, heater core pipe 12a) of the heater core pipes 12a and 12b. A number of resins may be used as a thermosetting resin, but preferably an epoxy resin.

The receiving portion 23 protrudes upwardly from the surface of the heat-transferring portion 24 and injection-molded integrally with the heat-transferring portion 24. The receiving portion 23 and the heat-transferring portion 24 are made of metal material to enhance heat-transferring efficiency, and preferably, made of aluminum material. Moreover, as shown in FIG. 9, the receiving portion 23 is formed in a frusto-conical shape which is narrowed downwardly, but is not limited to the above form. The receiving portion 23 guides the thermistor 22 to be easily received inside the receiving portion 23.

Therefore, when the thermistor 22 is mounted inside the lower housing 21a, the above structure of the receiving portion 23 allows a convenient adjustment of a mounted position of the thermistor 22 and allows that the receiving portion 23 is filled with the thermosetting resin 25 as much as the thermistor 22 and a part of each lead wire 26 connected to the thermistor 22 can be fixed by the thermosetting resin 25. As described above, the thermosetting resin 25 filling the receiving portion 23 to the upper end side thereof thoroughly prevents an inclination of the thermistor 22 to one side, protects the thermistor 22 inserted into the receiving portion 23, and prevents the thermistor 22 from being in contact with water, whereby the thermistor 22 can rapidly and precisely sense temperature.

Since the receiving portion 23 and the heat-transferring portion 24 are made of metal material of good heat transmission efficiency, temperature of cooling water flowing inside the heater core pipe can be more rapidly sensed.

That is, the heat-transferring portion 24 serves as a temperature sensing portion, which receives temperature of cooling water flowing inside the heater core pipe 12a, since the heat-transferring portion 24 is in plane contact with the outer periphery of the heater core pipe 12a (see FIGS. 8 and 9). The heat-transferring portion 24 providing the above function, as shown in FIG. 5, has a shape corresponding to a shape of the outer periphery of the heater core pipe 12a so that the heat-transferring portion 24 can be in contact with the outer peripheral surface of the heater core pipe 12a. In more detail, the heat-transferring portion 24 is formed in the shape of an arc, which is curved toward the upper housing 21b.

According to the above structure of the heat-transferring portion 24, a thermal time constant for transmitting heat around the sensor to the thermistor 22 is shortened and a response speed becomes more rapid, so that the water temperature sensor can measure water temperature more precisely.

In general, the thermal time constant is a constant for indicating how fast a resistance value is changed in correspondence with a rapid change of temperature around the thermistor or electric current flowing in the thermistor. The thermal time constant is shortened since the response speed becomes more rapid when heat capacity to a change of the surrounding conditions becomes smaller. That is, the thermal time constant means a time period required for reaching temperature at a point corresponding to 63.2% of the change when the thermistor is rapidly changed from the initial temperature T1(° C.) to the final temperature T2(° C.).

As a test example for checking the thermal time constant of the water temperature sensor according to the present invention, a water temperature sensor from which the receiving portion of the frusto-conical shape was removed was manufactured, and was put in water for the test. In this instance, the heat-transferring portion of the water temperature sensor was submerged in water, and the initial temperature T1 of water was set to 25° C. and the final temperature T2 was set to 50° C. The test result is shown in the following table 1.

TABLE 1

| T1(R) | T2(R) | t(sec) |
|---|---|---|
| 10.453 | 4.724 | 90.0 |

In Table 1, T1(R) is a resistance value when the initial temperature T1 of water is 25° C., T2(R) is a resistance value when the final temperature T2 of water is 50° C., and t is the time period required till temperature of the thermistor is changed from the initial temperature as much as a changed rate between the initial temperature T1 and the final temperature T2 is 63.2%.

As you can see from Table 1, in the case that only the heat-transferring portion is mounted on the lower end side of the water temperature sensor, the thermal time constant, namely a time period till a signal of temperature change was actually transmitted to the thermistor from a temperature change time point was 90 seconds. However, in the case that the receiving portion of the frusto-conical shape is also mounted inside the water temperature sensor according to the present invention, the thermal time constant was 24 seconds, and so, the response speed became about 26.6% more rapid. It means that the thermal time constant is greatly shortened and the response becomes more rapid when the receiving portion of the frusto-conical shape and the heat-transferring portion are adopted together in the water temperature sensor.

As described above, the thermistor 22 is mounted in the receiving portion 23 inside the lower housing 21a to sense temperature transmitted to the surface of the lower housing 21a from the outer peripheral surfaces of the heater core pipes 12a and 12b and senses temperature through the heat-transferring portion 24 mounted on the lower end side of the lower housing 21a to rapidly transmit the resistance value changing according to a temperature change to the external controlling device connected with the connector 28 through the lead wire 26 coupled to an end portion of the thermistor 22 and the terminal section 27.

Meanwhile, as shown in FIGS. 5 and 7, the lower housing 21a has a second directional coupling means coupled with the first coupling means.

The second coupling means includes first and second guide grooves 21a1 and 21a2 of an asymmetric structure respectively formed in a circumferential direction from a side portion of the lower housing 21a connected with the bottom side of the upper housing 21b.

When the lower housing 21a is rotated after being inserted into the insertion hole 14a of the heat-shielding cover 13, the first and second guide grooves 21a1 and 21a2 are formed to go over the first and second retaining portions 14a1 and 14a2 fixed on the insertion hole 14a according to the rotation of the lower housing 21a. As shown in FIG. 7, the first and second guide grooves 21a1 and 21a2 respectively have both ends which are not connected with each other to restrict a continuous rotation of the lower housing 21a.

As shown in FIG. 7, a first receiving groove 21a3 is formed on the front end portion of the first guide groove 21a1 for receiving the first retaining portion 14a1 formed on the insertion hole 14a, and a second receiving groove 21a4 is formed on the rear end portion of the second guide groove 21a2 for receiving the second retaining portion 14a2 formed on the insertion hole 14a.

Like the formation angle of the first and second retaining portions 14a1 and 14a2, a formation angle of the first and second receiving grooves 21a3 and 21a4 is within a range from 90° to 180°, and preferably, 150°.

In addition, the first and second receiving grooves 21a3 and 21a4 extend to a section of the lower housing 21a to respectively receive the first and second retaining portions 14a1 and 14a2 therein when the lower housing 21a is first inserted into the insertion hole 14a, and the extended portions respectively have shapes corresponding to the shapes of the first and second retaining portions 14a1 and 14a2.

Moreover, the first guide groove 21a1 has a first retaining groove 21a5 formed on the rear end portion thereof and the second guide groove 21a2 has a second retaining groove 21a6 formed on the front end portion thereof for receiving and retaining the first and second hemispherical retaining portions 14a1 and 14a2 thereto.

The first and second retaining grooves 21a5 and 21a6 are formed within an angle range at cross positions to each other like the formation positions of the first and second receiving grooves 21a3 and 21a4.

Referring to FIG. 7(a), the first and second retaining grooves 21a5 and 21a6 are deeper than the first and second receiving grooves 21a3 and 21a4.

Furthermore, the first guide groove 21*a*1 becomes narrower toward the first retaining groove 21*a*5 formed on the rear end portion thereof from the first receiving groove 21*a*3 formed on the front end portion thereof, and the second guide groove 21*a*2 becomes narrower toward the second retaining groove 21*a*6 formed on the front end portion thereof from the second receiving groove 21*a*4 formed on the rear end portion thereof.

As described above, the first and second retaining grooves 21*a*5 and 21*a*6, which are deeper than the first and second receiving grooves 21*a*3 and 21*a*4, are respectively formed on the portions of the guide grooves 21*a*1 and 21*a*2 which are gradually narrowed, and so, first and second retaining jaws 21*a*7 and 21*a*8 of a tiered structure are respectively formed at portions where the gradually narrowed guide grooves and the first and second retaining grooves 21*a*5 and 21*a*6 are connected with each other.

Additionally, the insertion hole 14*a* may have the second coupling means described above in stead of the first coupling means, and in this instance, the second coupling means which is formed on the lower housing 21*a* of the water temperature sensor 20 may be substituted with the first coupling means. As described above, the interchange in the formation positions of the first and second coupling means has no influence on the functions and operation mechanism of the present invention.

The water temperature sensor 20 is a doubly injection-molded structure formed in the steps of: integrally forming the heat-transferring portion 24 and the receiving portion 23; putting the thermistor 22 into a receiving space of the receiving portion 23, filling the receiving portion 23 with epoxy resin and hardening it with heat to fix the thermistor 22 to the receiving portion 23; first injection-molding components of the thermistor 22, the lead wire 26 and the terminal section 27 with plastic resin to form one assembly; and second injection-molding the first injection-molded assembly integrally with the housing body 21.

As described above, the water temperature sensor 20, which is constructed of the doubly injection-molded structure, can reduce manufacturing costs and enhance work efficiency by greatly reducing the number of work processes since it can reduce the number of components.

Moreover, as shown in FIG. 9, to keep a long distance between the lead wires 26 as far as possible to prevent short, it is preferable that the lead wires 26 are connected from the thermistor 22 to the terminal sections 27 in the shape of a 'Y' in cross section.

Hereinafter, referring to FIG. 7, an assembling method of the water temperature sensor 20 according to the present invention will be described in detail.

First, as shown in FIG. 7(*a*), an operator grasps the water temperature sensor 20 in such a way that the connector 28 of the water temperature sensor 20 directs upwardly.

When the initial insertion direction of the water temperature sensor 20 is decided, the operator pushes the lower housing 21*a* toward the insertion hole 14*a*.

In this instance, as shown in FIG. 7(*a*), since the first and second retaining portions 14*a*1 and 14*a*2 formed on the insertion hole 14*a* to be cross to each other are naturally accommodated into the first and second receiving grooves 21*a*3 and 21*a*4 formed on the lower housing 21*a* and the initial assembling position of the water temperature sensor 20 is decided, it is not happened that the operator misassembles the water temperature sensor 20 due to the operator's carelessness.

After that, when the connector 28 is rotated in an arrow direction (in FIGS. 7(*a*) and 7(*b*), the arrow direction is shown in the counterclockwise direction since the water temperature sensor is illustrated in a cross section, but is a clockwise direction in fact), the first and second guide grooves 21*a*1 and 21*a*2 formed on the lower housing 21*a* are respectively rotated while going over the first and second retaining portions 14*a*1 and 14*a*2.

When the rotational angle reaches about 90°, as shown in FIG. 7(*b*), the first and second retaining grooves 21*a*5 and 21*a*6 formed on the first and second guide grooves 21*a*1 and 21*a*2 are respectively accommodated and retained to the first and second retaining portions 14*a*1 and 14*a*2 by the retaining jaws 21*a*7 and 21*a*8 of the first and second retaining grooves 21*a*5 and 21*a*6, whereby they can be completely fixed to the first and second retaining portions 14*a*1 and 14*a*2 without separation.

As described above, such a structure that the water temperature sensor 20 is mounted on the outer surface of the air-conditioning case 10 can fundamentally prevent an air leakage occurring when the water temperature sensor is mounted inside the air-conditioning case as the prior arts, and reduce an operation time period and enhance work efficiency since the water temperature sensor is more easily and simply mounted on the outer surface of the air-conditioning case. Particularly, the present invention can greatly increase productivity through a reduction of manufacturing costs by greatly reducing the number of components (for instance, epoxy resin, an insulating tube, a clip, and so on) of the water temperature sensor and providing the water temperature sensor of one module type, and greatly enhance work efficiency and productivity by greatly reducing the number of work processes through the reduction of the number of components.

As described above, since the heat-transferring portion made of metal material is mounted on the lower end side of the lower housing of the water temperature sensor, the receiving portion of the frusto-conical shape formed integrally with the heat-transferring portion is mounted inside the lower housing and the thermistor is inserted into the internal space of the receiving portion and fixed with epoxy resin, the present invention can greatly improve the response speed and the degree of precision in temperature measurement by shortening the thermal time constant.

Moreover, the present invention can greatly enhance productivity due to a reduction of the number of components and manufacturing costs since the housing body and the thermistor of the water temperature sensor are injection-molded doubly and formed integrally with each other.

In addition, since the water temperature sensor is mounted on the heat-shielding cover of the heater core pipes mounted on the outer surface of the air-conditioning case, the present invention can fundamentally prevent the air leakage occurring when the water temperature sensor is mounted in an insertion space formed in the lower end portion of the air-conditioning case as the prior arts. Particularly, the present invention can enhance work efficiency and productivity since the water temperature sensor, which is reduced in the number of components and in the number of work processes, is easily and simply mounted on the outer surface of the air-conditioning case.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A water temperature sensor for an air conditioner of automotive vehicles comprising:

a thermistor of which resistance varies depending on the temperature of cooling water of a heater core mounted inside an air-conditioning case;

a housing body having a receiving portion, a lower housing and an upper housing, the receiving portion formed in the lower housing and having a predetermined space for receiving and surrounding the thermistor, the predetermined space being filled with thermosetting resin for fixing the thermistor, the lower housing having a heat-transferring portion formed on a lower end side thereof, and the upper housing being curved from an upper end side of the lower housing in one direction and having a connector formed on an end portion thereof; and terminal sections coupled to end portions of lead wires separately connected to the thermistor inside the housing body and connected to the connector side, wherein the lower housing extended in a substantially perpendicular direction to the heater core pipes is fixed to a heat-shielding cover surrounding heater core pipes which the cooling water is flowing through, and are exposed to the outside of the air-conditioning case to allow the heat-transferring portion to come into contact with the heater core pipes, and the upper housing extends in substantially parallel plane with the heater core pipes.

2. The water temperature sensor according to claim 1, wherein the receiving portion is formed in a frusto-conical shape to easily receive and fix the thermistor therein and thereto and integrally protrudes from the heat-transferring portion.

3. The water temperature sensor according to claim 1, wherein the receiving portion and the heat-transferring portion are made of metal material to increase a heat transfer rate from the heater core pipes to the thermistor.

4. The water temperature sensor according to claim 1, wherein an interval between the lead wires is gradually widened as it goes from the thermistor to the terminal sections in a longitudinal direction.

5. The water temperature sensor according to claim 1, wherein the heat-transferring portion formed on the lower end side of the lower housing is formed in the shape of an arc to be in close contact with the outer peripheral surfaces of the heater core pipes.

6. The water temperature sensor according to claim 1, wherein the water temperature sensor is formed integrally by a double injection-molding.

7. A water temperature sensor for an air conditioner of automotive vehicles comprising:

a thermistor of which resistance varies depending on the temperature of cooling water of a heater core mounted inside an air-conditioning case;

a housing body having a receiving portion, a lower housing and an upper housing, the receiving portion formed in the lower housing and having a predetermined space for receiving and surrounding the thermistor, the predetermined space being filled with thermosetting resin for fixing the thermistor, the lower housing having a heat-transferring portion formed on a lower end side thereof, the lower housing being fixed to a heat-shielding cover surrounding heater core pipes which the cooling water is flowing through, and are exposed to the outside of the air-conditioning case to allow the heat-transferring portion to come into contact with the heater core pipes, and the upper housing being curved from an upper end side of the lower housing in one direction and having a connector formed on an end portion thereof; and terminal sections coupled to end portions of lead wires separately connected to the thermistor inside the housing body and connected to the connector side, wherein the lower housing is inserted into an insertion hole formed on the heat-shielding cover and further includes a second coupling means fixedly coupled to a first coupling means formed on the inner peripheral surface of the insertion hole.

8. The water temperature sensor according to claim 7, wherein the first coupling means is the first and second retaining portions coupled with the second coupling means, first and second guide grooves; or the first and second guide grooves coupled with the second coupling means, first and second retaining portions.

9. The water temperature sensor according to claim 8, wherein the first guide groove includes a first receiving groove formed on a front end portion thereof and a first retaining groove formed on a rear end portion thereof.

10. The water temperature sensor according to claim 8, wherein the second guide groove includes a second retaining groove formed on a front end portion thereof and a second receiving groove formed on a rear end portion thereof.

* * * * *